US010652532B2

(12) United States Patent
Dai et al.

(10) Patent No.: US 10,652,532 B2
(45) Date of Patent: May 12, 2020

(54) METHOD AND APPARATUS FOR REFERENCE FRAME MANAGEMENT FOR VIDEO COMMUNICATION

(71) Applicants: Wei Dai, Shanghai (CN); Zesen Zhuang, Shanghai (CN); Jian Lou, Santa Clara, CA (US); Qianzong Chen, Shanghai (CN); Jiali Li, Shanghai (CN)

(72) Inventors: Wei Dai, Shanghai (CN); Zesen Zhuang, Shanghai (CN); Jian Lou, Santa Clara, CA (US); Qianzong Chen, Shanghai (CN); Jiali Li, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 139 days.

(21) Appl. No.: 15/448,586

(22) Filed: Mar. 2, 2017

(65) Prior Publication Data

US 2018/0014010 A1    Jan. 11, 2018

Related U.S. Application Data (60) Provisional application No. 62/359,142, filed on Jul. 6, 2016.

(51) Int. Cl.
*H04N 19/105* (2014.01)
*H04N 19/164* (2014.01)
*H04N 19/114* (2014.01)
*H04N 19/58* (2014.01)
*H04N 21/6373* (2011.01)
(Continued)

(52) U.S. Cl.
CPC ......... *H04N 19/105* (2014.11); *H04N 19/114* (2014.11); *H04N 19/115* (2014.11); *H04N 19/15* (2014.11); *H04N 19/164* (2014.11); *H04N 19/172* (2014.11);
(Continued)

(58) Field of Classification Search
CPC ........ H04B 3/06; H04N 19/12; H04N 19/164; H04N 19/177; H04N 21/2401; H04N 21/2402
USPC ........... 375/E7.211, E7.027, E7.011, E7.023, 375/E7.155; 709/231
See application file for complete search history.

(56) References Cited

U.S. PATENT DOCUMENTS

6,859,498 B1 * 2/2005 Choi .................. H04N 21/6377
375/240.27
2008/0247463 A1 * 10/2008 Buttimer .............. H04N 19/105
375/240.12
(Continued)

*Primary Examiner* — Tsion B Owens
*Assistant Examiner* — Daniel Chang
(74) *Attorney, Agent, or Firm* — Kang S. Lim (57) ABSTRACT

System and methods of managing reference frame adaptively for video communication under a network are provided. The system adaptively decides the interval between each I frame, the bitrate of the encoded bit steams, and the resolution of the encoded video to achieve quick connection. The system may set the appropriate reference frame(s) for the current frame, manage the reference frame(s) in the DPB to be long/short term reference frame(s) or mark them as unused for reference; mark the current frame to be a long term reference frame, a short term reference frame, unused for reference or skip encoding the current frame; adaptively change the ratio of long term reference frame(s) with respect to the short term reference frame(s) in the DPB; adaptively change the frequency ratio of marking the current frame as long term reference frame and marking the current frame as short term reference frame.

25 Claims, 8 Drawing Sheets

(51) Int. Cl.
*H04N 19/115* (2014.01)
*H04N 19/15* (2014.01)
*H04N 19/172* (2014.01)
*H04N 19/59* (2014.01)
*H04N 19/184* (2014.01)

(52) U.S. Cl.
CPC ............ *H04N 19/58* (2014.11); *H04N 19/59* (2014.11); *H04N 21/6373* (2013.01); *H04N 19/184* (2014.11)

(56) References Cited

U.S. PATENT DOCUMENTS

| | | | | |
|---|---|---|---|---|
| 2013/0003845 | A1* | 1/2013 | Zhou | H04N 19/197 375/240.16 |
| 2013/0148633 | A1* | 6/2013 | Ekman | H04L 47/122 370/331 |
| 2015/0312572 | A1* | 10/2015 | Owen | H04N 19/102 375/240.02 |

* cited by examiner

METHOD AND APPARATUS FOR REFERENCE FRAME MANAGEMENT FOR VIDEO COMMUNICATION

CROSS REFERENCE TO RELATED APPLICATION

This application claims the benefit of U.S. Provisional Application No. 62/359,142 filed on Jul. 6, 2016, entitled "Method and Apparatus for Reference Frame Management for Video Communication", which is incorporated herein in its entirety by this reference.

FIELD

This disclosure relates to systems and methods which deals with establishing connection and managing the reference frames for video communication. More particularly, the embodiments of the invention relate to systems and methods which deal with establishing connection and managing the reference frames under a network for video communication.

BACKGROUND

With advances in and proliferation of communication technologies, content sharing has become commonplace. For instance, video communication has experienced increasing demand and has seen tremendous growth in popularity.

In video coding, intra/inter prediction is introduced to reduce the spatial/temporal redundancy inherent in video data. In inter prediction, at the encoder side, to code the current block, one or more previous reconstructed frames from the decoded picture buffer (DPB) will construct one or two reference frame lists for the current frame to find its most similar block. At the decoder side, based on the information in the bit stream, the decoder will find the corresponding reconstructed frames from its DPB and locate the corresponding block location in the reference frame for reconstruction.

There could be two kinds of reference frames, which are short term reference frames and long term reference frames. A short term reference frame will be removed automatically when the DPB is full or by an explicit command. However, a long term reference frame may only be removed by an explicit command. At the decoder side, once all the frame(s) in the reference list(s) for the current frame are found, the current frame may be correctly decoded.

Due to the network restrictions, there will always be packet loss during the transmission. When packet loss occurs, one possible way is to ask the sender to resend the packet again, which may take a long time to get the missing packet. However, for real-time video communication, live video communication or interactive video communication scenarios, this time delay might not be acceptable. Therefore, for these scenarios, when packet loss occurs, the current frame will be discarded and may not be used for future reference, which may cause the decoding problem for the subsequent frame(s) under the traditional reference frame management approaches. Especially, during the connection process, since the I frame is very large, it is very likely to have a high probability of packet loss. Therefore, how to establish the connection as quick as possible is also a very challenging problem.

Therefore, novel systems and methods are proposed to establish the connection and manage reference frames for video communication under the packet loss scenario, especially for real-time video communication, live video communication and interactive video communication.

SUMMARY

Embodiments of the present invention propose systems and methods of establishing connection quickly, and managing reference frame adaptively for video communication under a network. For connection process, based on the network types of all clients and network conditions, such as network bandwidth, network delay and network congestions, the system may adaptively decide the interval between each I frame, the bitrate of the encoded bit steams, and the resolution of the encoded video to achieve quick connection. Moreover, based on the feedback of other clients and network conditions, the system may decide to re-enter the connection process, if, but not limited to, the current bandwidth is very low or high, the system does not receive the feedback for a long time or the network suffers a huge network congestion. For communication process, according to the feedback from other clients and the network conditions, the system may, but is not limited to, set the appropriate reference frame(s) for the current frame, manage the reference frame(s) in the decoded picture buffer (DPB) to be long/short term reference frame(s) or mark them as unused for reference; mark the current frame to be a long term reference frame, a short term reference frame, unused for reference or skip encoding the current frame; adaptively change the ratio of long term reference frame(s) with respect to the short term reference frame(s) in the DPB; adaptively change the frequency ratio of marking the current frame as long term reference frame and marking the current frame as short term reference frame.

BRIEF DESCRIPTION OF THE DRAWINGS

In order that embodiments of the present invention may be more clearly ascertained, some embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of embodiments of the present invention. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It may be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as singular forms, unless the context clearly indicates otherwise. It will be further understood that the terms "comprises" and/or "comprising," when used in this specification, specify the present of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, may be interpreted as having a meaning that is consistent with their meaning in the context of the relevant art and the present disclosure and will not be interpreted in an idealized or overly formal sense unless expressly so defined herein.

It will be understood that a number of techniques and steps are disclosed. Each of these has individual benefit and each may also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims may be read with the understanding that such combinations are entirely within the scope of the invention and claims.

Methods and systems for quick connection between clients, reference frame selection, and reference frame management are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
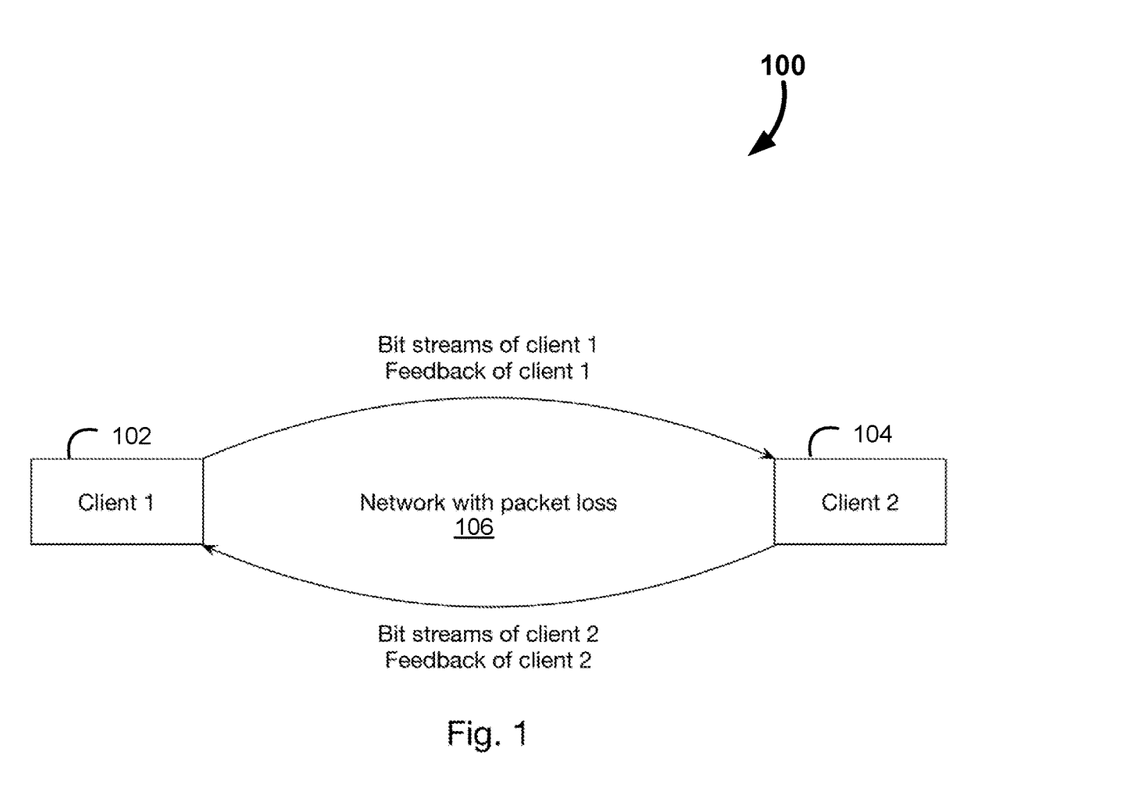
FIG. 1 illustrates a scenario of two clients using video communication through a network, in accordance with some embodiments.

The presently disclosed systems and methods will now be described by referencing the appended figures. FIG. 1 illustrates a video communication system 100 of two clients 102 and 104 communicating with each other under a network 106. Client 1 102 receives the feedback and bit streams from client 2 104 and transmits its feedback and bit streams to client 2 104 through a network 106. However, due to the restrictions of the network, there may be feedback problems due to either packet loss resulting in lost feedback, or time delay during the transmission resulting in the feedback being out of date. The bit streams and feedback received at client 1 102 from client 2 may not be original bit streams and feedback sent from client 2 104 and vice versa. Also, the bit streams and feedback received at client 1 102 from client 2 104 may out of date and vice versa. The present invention is designed to deal with this kind of, but not limited to, video communication scenarios through a network. The network 106 most typically includes the internet, but may also include other networks such as a corporate WAN, cellular network, or combination thereof, for example.

Figure 2:
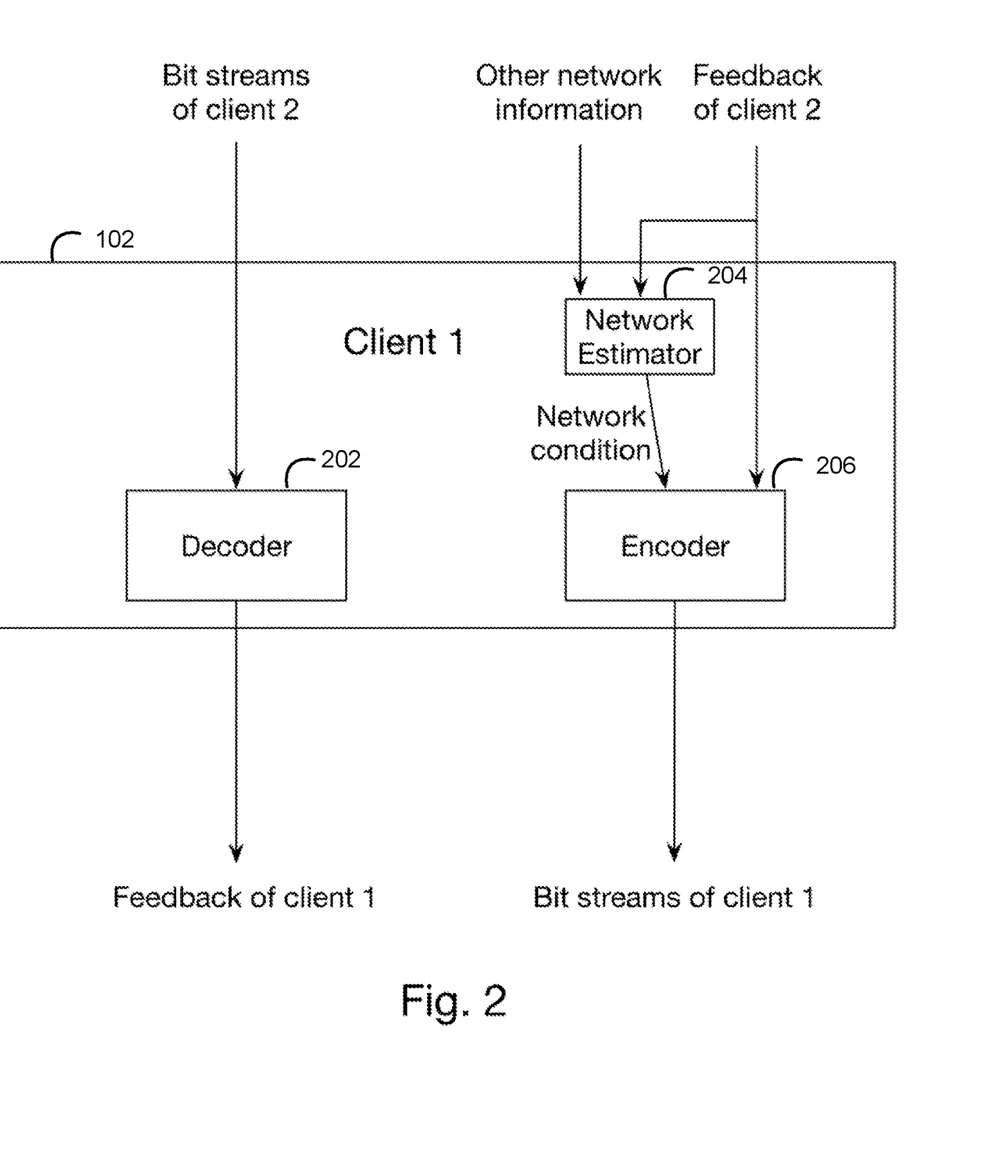
FIG. 2 illustrates an example of each client receives the feedback and bit streams from other clients and sends its feedback and bit streams to other clients, in accordance with some embodiments.

FIG. 2 illustrates an example of system of client 1 102 receives the feedback and bit streams from client 2 104 and sends its feedback and bit streams to client 2 104. Client 1 102 receives the feedback from client 2 104, together with other network information, estimates the network condition, encodes its video according to the feedback and network condition, and sends the encoded bit streams to client 2 104. This is accomplished via a network estimator 204 and encoder 206. During the transmission, there may be packet loss and the client 1's decoder 202 will try to decode the bit streams from client 2 104 and send the feedback to client 2's encoder through the network.

In the following paragraphs, it is assumed there are two clients communicating with each other. For this disclosure, we denote "encoder" as the encoder 206 from client 1 102 and "decoder" as the decoder (not illustrated) from client 2 104. It is assumed the total number of reference frames in decoded picture buffer (DPB) is eight (8) both for the encoder 206 and the decoder, where eight (8) may be any other number in real cases. We denote "L" as the number of long term reference frame(s) in DPB and "S" as the number of short term reference frame(s) in DPB. Note that L+S may be less than or equal to eight (8) in this case. In FIG. 4 to FIGS. 7A and 7B, the frame marked as "C" represents the current frame, the frame(s) marked as "LR" represent the long term reference frame(s) and the frame(s) marked as "SR" represent the short term reference frame(s). Also, we denote the frame which is correctly decoded by decoder and successfully feedback to encoder as a "good frame".

Figure 3:
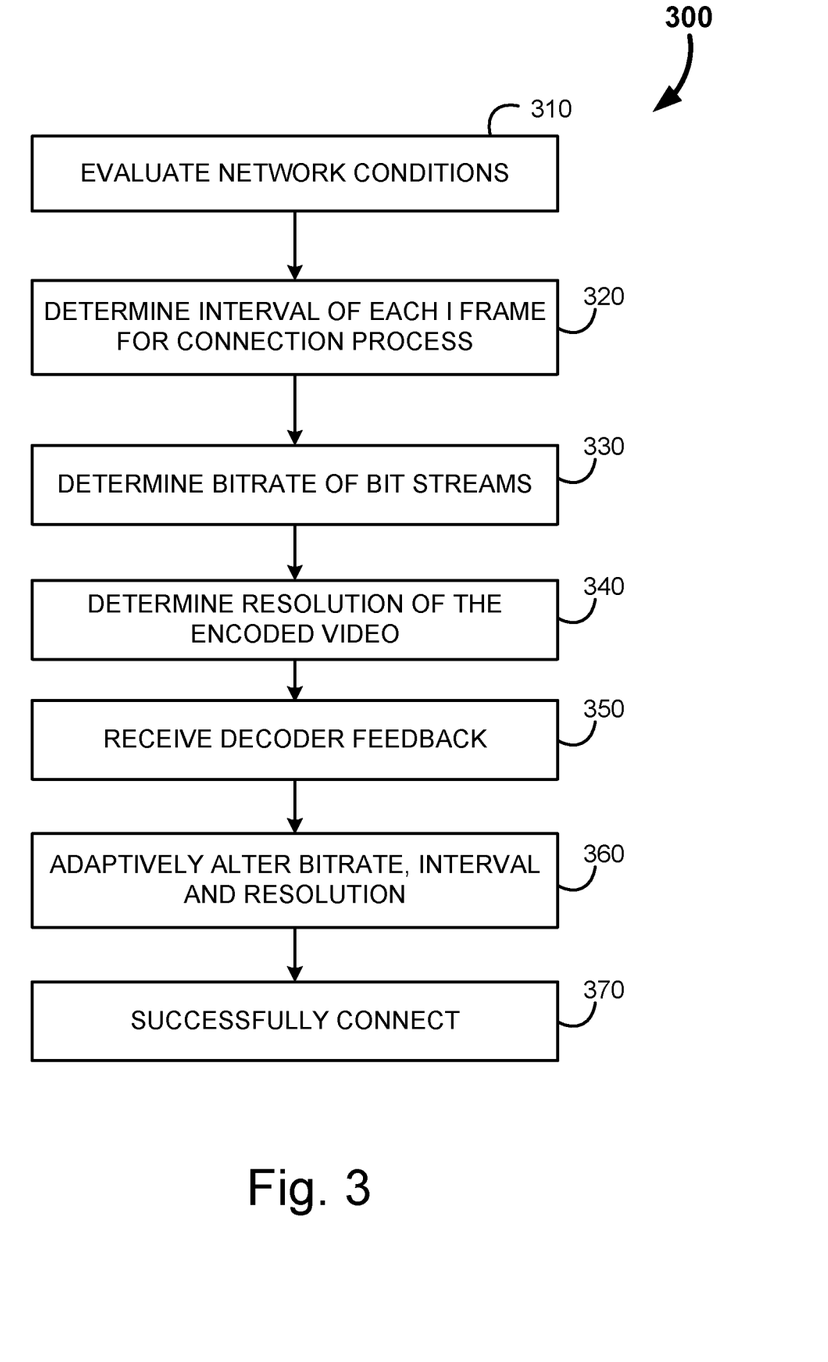
FIG. 3 illustrates a process flow diagram for one example method of managing frame reference during connection, in accordance with some embodiments.
Figure 4:
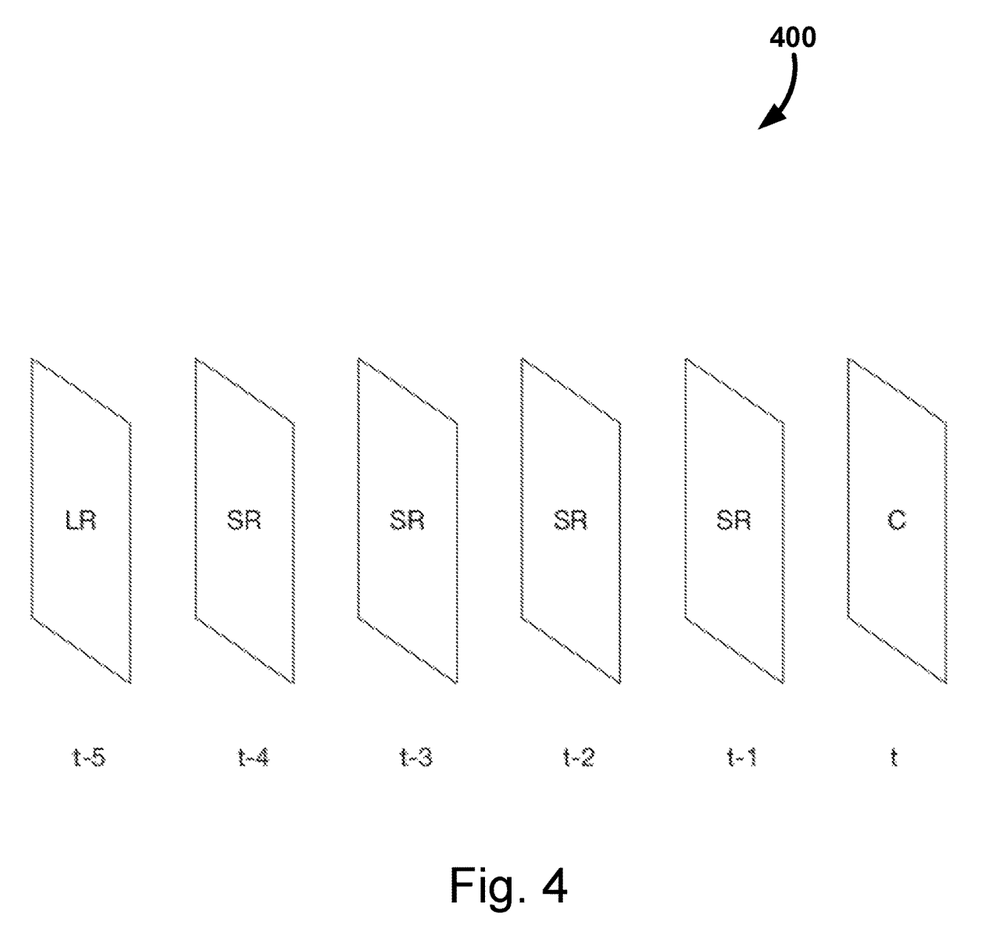
FIG. 4 illustrates an example of the encoder's decoded picture buffer (DPB) status, in accordance with some embodiments.

Turning to FIG. 3, a process for efficient connection with adaptive reference frame management, shown generally at 300. At the beginning of the connection process, in order to display the video at other clients and establish the connection in a very short time, the system will decide the network condition (at 310) based on, but not limited to, the local network type, local network conditions, network types of other clients, network conditions of other clients and other network information, such as network bandwidth, network delay and network congestions. Once the network condition is determined, the system may decide the interval of each I frame (at 320) during the connection stage, the bitrate of the bit streams (at 330), and the resolution of the encoded video (at 340). Moreover, during the connection process (prior to a successful connection by the system, whereby 'successfully connected' means there are feedback from other clients indicating that they have successfully received and decoded the I frames), the system receives feedback from the decoder (at 350). This feedback may be utilized by the system to adaptively change the interval of I frame, the bitrate of the bit streams (which may include I frames and/or P frames) and the resolution of the encoded video (at 360). Network conditions may likewise be factored into the process for adaptively altering bitrates, interval and resolution. The system eventually receives feedback from the other clients that they have successfully received and decoded the I frames, which signifies that the connection is successful (at 370). Below is provided a pair of examples relating to this process for connecting the client devices using the above process:

a. For example, suppose we have two clients, and the two clients want to establish a connection between each other. If both of the two clients are in a very good network, the system may, but not limited to, send consecutive I frame every 200 ms with 500 kbps bitrate and 640×360 resolution. Otherwise, if one of the clients is under a very bad network, such as 2G network (large delay, limited bandwidth and large packet loss), the system may, but not limited to, send consecutive I frame every is with 20 kbps bitrate and 180×120 resolution. By this approach, the system may set an appropriate profile to avoid the network congestion due to the asymmetric network condition between different clients and also ensure that all the clients may display the view as quick as possible (less than 1 s). For the above system the bitrate may be selected from any value in the range of 1000-10 kbps. In alternate embodiments, the bitrate may range between 500-20 kbps. In some embodiments, the bitrate may vary by 10 kbps based upon network quality. In alternate embodiments the bitrate may be 500 kbps for 4G level network quality, between 300-100 kbps for 3G quality network, between 150-50 kbps for LTE (long term evolution) quality networks, and 50-20 kbps for 2G quality networks. Likewise, for the above system the I frame interval may be selected from any value in the range of 100 ms to 2 seconds. In alternate embodiments, the I frame interval may range between 200 ms to 1 second. In some embodiments, the I frame interval may vary by 100 ms increments based upon network quality. In alternate embodiments the bitrate may be 200 ms for 4G level network quality, between 400-700 ms for 3G quality network, between 600-900 ms for LTE (long term evolution) quality networks, and 900-1000 ms for 2G quality networks. Likewise, for the above system the encoded video resolution may be selected from any value in the range of 720×480 resolution to 160×120 resolution. In alternate embodiments, the encoded video resolution may range between 640×360 resolution to 180×120 resolution. In some embodiments, the encoded video resolution may be 640×360 or 640×480 for 4G level network quality, 512×384 or 512×288 for 3G quality network, 320×240 or 265×192 or 320×180 for LTE (long term evolution) quality networks, and 180×120 or 160×120 for 2G quality networks.

b. For example, suppose one client is under a very unstable network, the system may adaptively choose an appropriate profile for encoder. If the client switches its network from 4G to 2G network for some reason, the system may adaptively choose a lower profile for encoder to send the bit streams during the connection stage for quick connection.

Moreover, during the communication process, the system may decide to re-enter the connection process if, but not limited to, the current bandwidth is very low, the system does not receive the feedback for a long time or the network suffers a huge network congestion. For example, if client 1 does not receive the feedback from client 2 for a very long time (more than 2 s for example), there will be a high probability that the network suffers a large congestion, packet loss or small bandwidth. Then the system may re-set an appropriate profile and re-enter the connection process in order to get a better communication performance. Likewise, if the current bandwidth is very high, the system may likewise re-enter the connection process in order to reset the system to a higher profile to take advantage of the available bandwidth with larger resolution video thereby improving the user experience.

The encoder may set the reference frame(s) in the DPB of the current frame according to the decoder's feedback. For example, in FIG. 4, there are a total of 5 reference frames in the DPB, shown generally at 400. If the decoder transmits a signal that frame t-3 is correctly decoded, then the encoder may choose the reference frame t-3 as the only reference frame of current frame t to ensure that frame t is decodable once it is fully received by the decoder of other clients or the encoder may choose other frames as the reference frames to achieve optimal compression performance.

The encoder may set the reference frame(s) in the DPB to be long/short term reference frame(s). For example, in FIG. 4, since frame t-3 is correctly decoded by the decoder, it is considered to be more important than other frames. Then encoder may mark frame t-3 as a long term reference frame from short term reference frame to avoid being automatically removed from the DPB due to the short term reference frame restrictions.

The encoder may mark the reference frame(s) in the DPB as unused for reference according to the decoder's feedback. For example, in FIG. 4, if the decoder transmits the signal that frame t-2 encounters packet loss and is not decodable or the encoder does not receive the signal whether frame t-2 is correctly decoded or not for a long time, the encoder may explicitly remove frame t-2 to clean up the buffer memory to store other good frames.

The encoder may mark the current frame to be a long term reference frame, a short term reference frame, unused for reference or skip encoding the current frame, according to the decoder's feedback. Below is provided examples relating to this process for marking current frames as long term reference, short term reference frame, unused for reference or skip encoding the current frame:

a. For example, if the current frame is considered to be very important, the encoder may mark the current frame as a 'long term reference frame' for future reference.

b. For example, during the connection stage, the encoder may continuously send I frames until the encoder receives the signal that the decoder correctly receives one of the I frames and this I frame also exists in the encoder's DPB. In this case, all I frames that the encoder sends are important, and the encoder may mark the I frames as 'long term reference frames'.

c. For example, if the current frame uses a frame which is correctly decoded by the decoder as the reference frame, it may ensure that once the decoder receives all of the packets of the current frame, it may be correctly decoded. Then the encoder may mark the current frame as a 'long term reference frame' for future reference.

d. For example, if the current frame is considered to be less important, the encoder can mark the current frame as a short term reference frame, or, to avoid removing other more important reference frames in the DPB, as unused for reference.

e. For example, if the current frame uses a frame which is not correctly decoded by the decoder, then the encoder may mark the current frame as 'unused for reference' to avoid removing other good frames in the DPB.

f. For example, if the current frame uses a frame which is unknown whether the decoder correctly decodes it or not, the encoder may mark the current frame as a 'short term reference frame' for future reference.

g. For example, if the network has a large time delay, the encoder can mark the current frame as unused for reference to reduce the encoder's DPB update frequency.

h. For example, if the decoder's feedback indicates that the network is bad, the encoder can skip encoding the current frame.

i. For example, if the network experiences a large network congestion, the encoder can skip encoding the current frame.

Figure 5A:
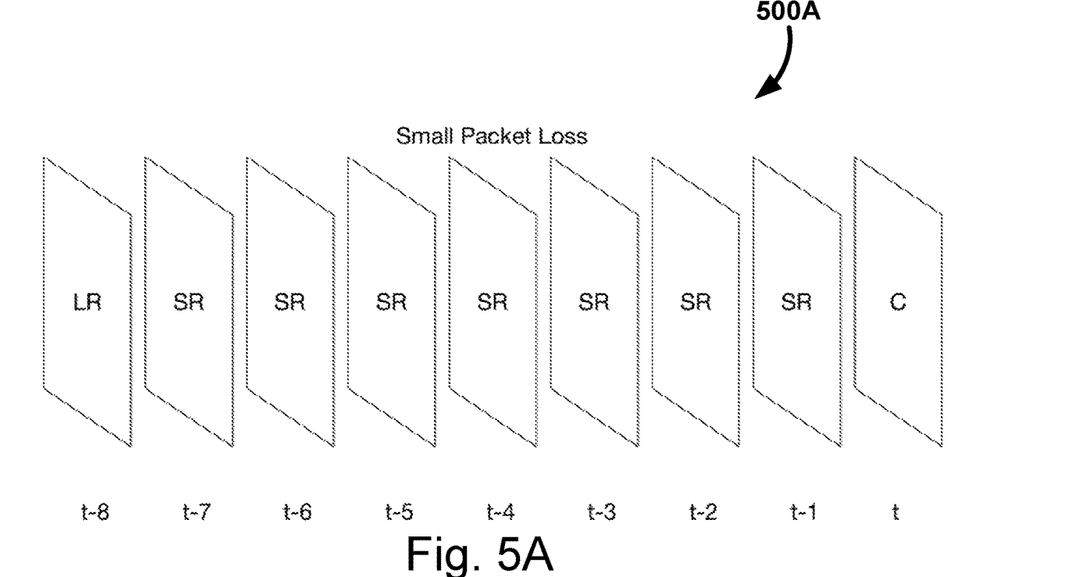
FIGS. 5A and 5B illustrate examples of marking more long term reference frames in encoder under large packet loss scenario, in accordance with some embodiments.
Figure 5B:
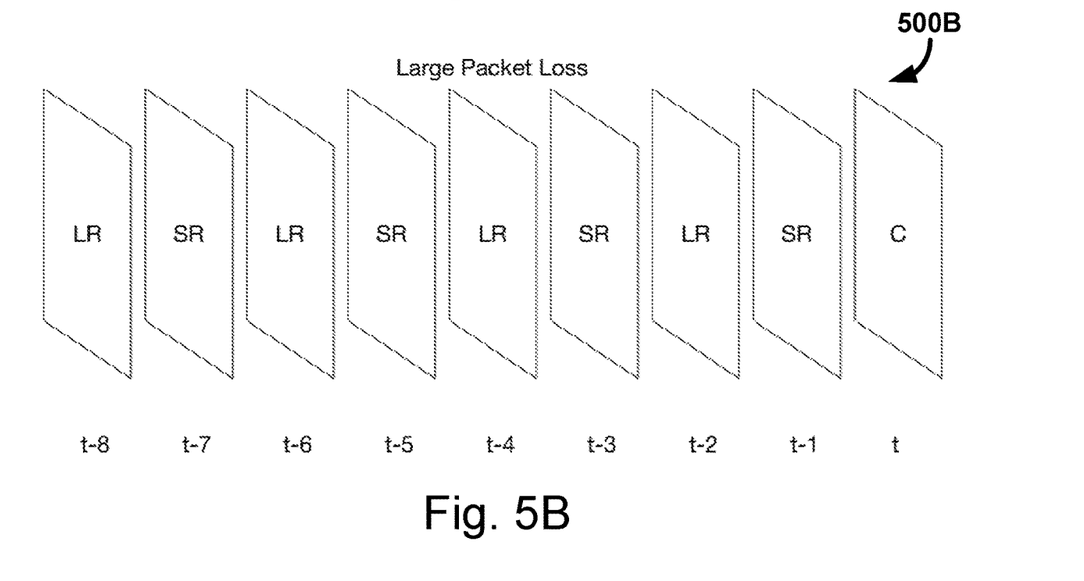
Figure 6A:
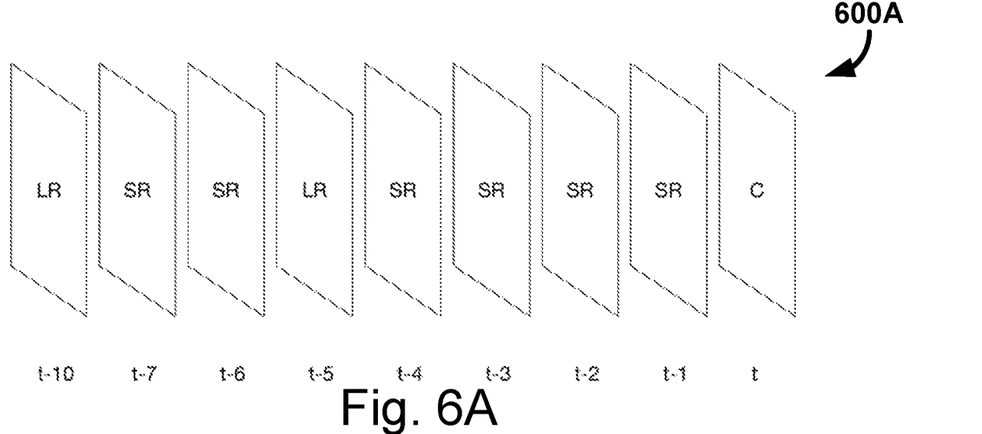
FIGS. 6A, 6B and 6C illustrate examples of marking more long term reference frames in encoder under large time delay scenario, in accordance with some embodiments.
Figure 6B:
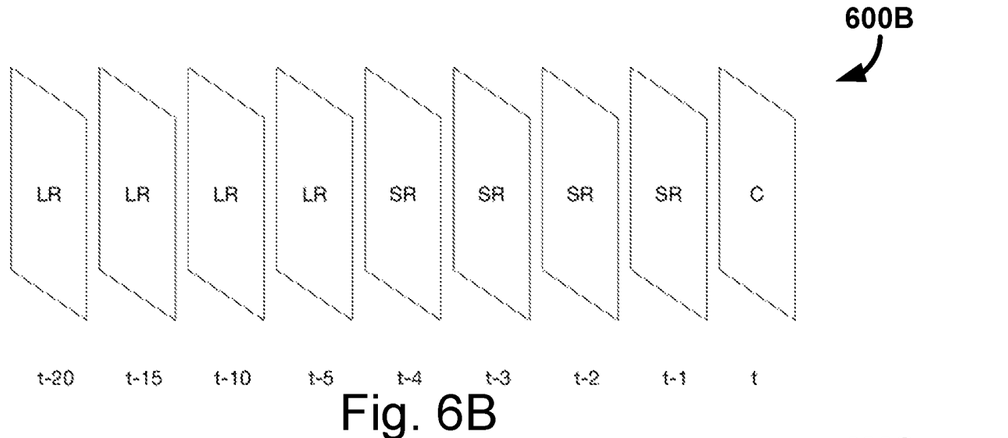
Figure 6C:
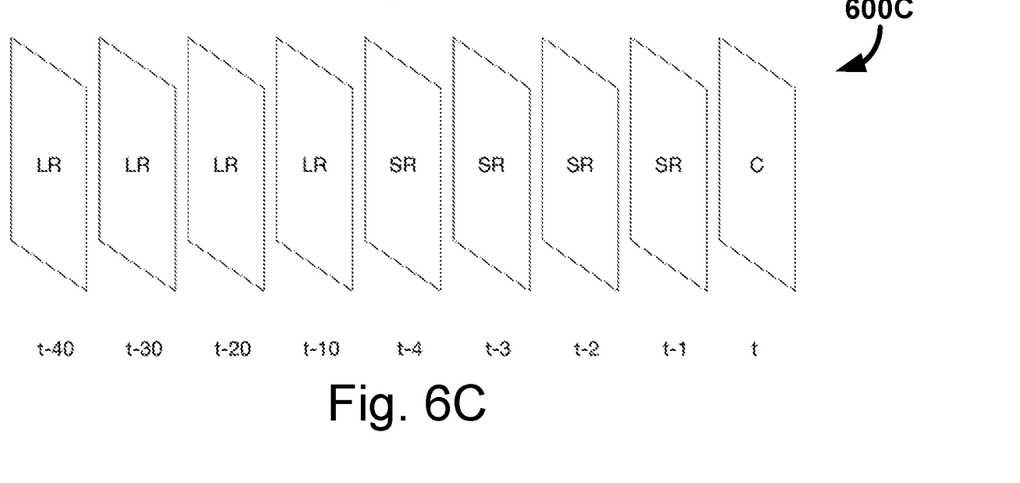

The encoder may adaptively change the ratio of long term reference frame(s) with respect to short term reference frame(s) in the DPB according to the network condition. Below is provided examples of this dynamic ratio between long term vs. short term reference frames:

a. For example, if the network has a large packet loss, the encoder may store more long term reference frame(s) than short term reference frame(s) in the DPB. This may help to store more recently correctly decoded frames as long term reference frames. And the long term reference frame will not be automatically removed unless the encoder transmits command to the decoder explicitly. For example, in FIG. 5A, if the network has a small packet loss, the encoder may only mark one long term reference frame for each 8 reference frames and only save one long term reference frame in DPB, shown generally at 500A. In FIG. 5A, only frame t-8 is marked as long term reference frame and will not be removed without an explicit command. While, in FIG. 5B, if the packet loss is large, the encoder may mark 4 long term reference frames for every 8 reference frames, shown generally at 500B. In FIG. 5B, frames t-8, t-6, t-4 and t-2 are marked as long term reference frames and will not be removed without an explicit command. If frame t-8 is not correctly decoded but frame t-6 is correctly decoded, frame t-6 may be automatically removed in FIG. 5A scenario but will not be automatically removed in FIG. 5B, which successfully keeps a good frame in the DPB buffer.

b. For example, if the network has a large time delay, the feedback from the decoder is very likely to be out of date when it arrives at the encoder. Therefore, the encoder may store more long term reference frame(s) than short term reference frame(s) in the DPB. This may help the encoder DPB to cover a larger time scale. For example, in FIG. 6A, if we mark a long term reference frame every 5 frames, and only keep 2 long term reference frames, then the encoder DPB may only cover up to 10 frames delay, as seen at 600A. If the time delay for the network is larger than 10 frames, then all the feedback from the decoder is out of date at the encoder side. However, in FIG. 6B, if we keep 4 long term reference frames with also one long term reference frame every 5 frames, the encoder may cover up to 20 frames time delay, which means even if the decoder's feedback is more than 10 frames delay to the encoder, it might still be useful, as seen at 600B.

The encoder may adaptively change the frequency ratio of marking the current frame as long term reference frame and marking the current frame as short term reference frame. For example, if the network has a large time delay, the encoder may choose to decrease the frequency of encoding one long term reference frame respect to short term reference frame(s). For example, in FIG. 6B, the encoder encodes one long term reference frame every 5 frames, and keeps 4 long term reference frames in the DPB. While in FIG. 6C, the encoder encodes one long term reference frame every 10 frames, and also keeps 4 long term reference frames in the DPB, as seen at 600 C. We may see that for FIG. 6B, the encoder's DPB may cover 20 frames delay while for FIG. 6C, the encoder's DPB may cover 40 frames delay.

The encoder may transmit the reference frame management command explicitly to the decoder to make sure the decoder may correctly decode the current frame even if the DPB of encoder and the DPB of decoder are mismatched. Due to the network restrictions, the command may be lost during the transmission. Therefore, the encoder may consider all the possibilities while transmitting the reference frame management command over a network.

In one case, if the encoder changes the ratio of the long term reference frame(s) with respect to the short term reference frame(s), the encoder may assume the decoder does not receive this command until the encoder receives the signal that decoder receives this command successfully. The encoder may, but is not limited to, repeatedly transmit this command for the following frames and the encoder may, but is not limited to, assume the decoder does not receive this command when transmitting other reference frame management related commands until the decoder's feedback indicates that the decoder successfully receive this command.

Figure 7A:
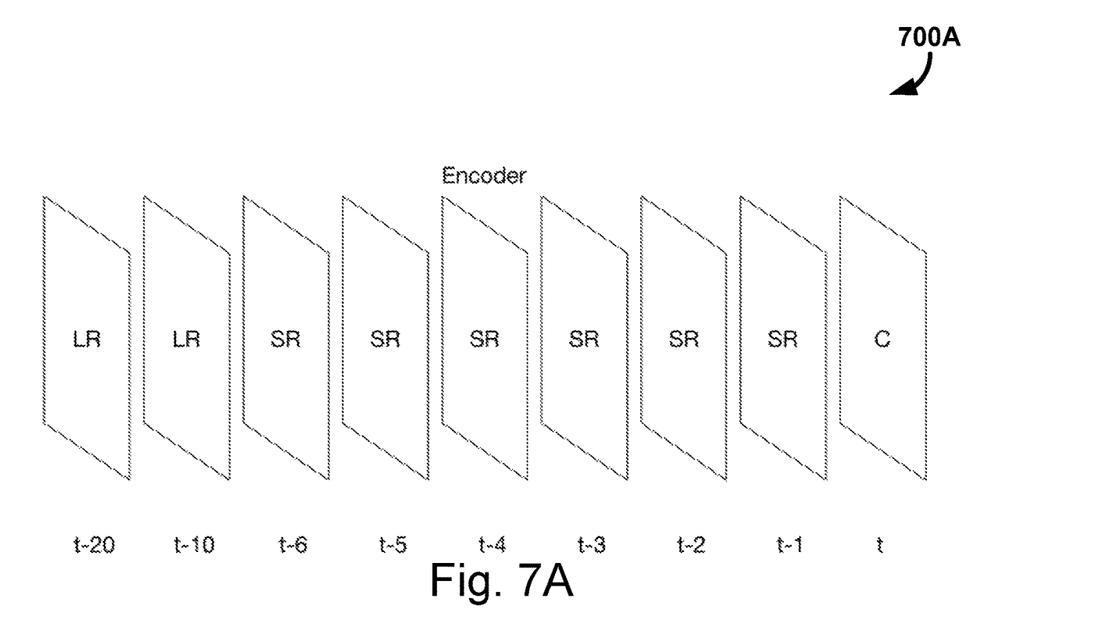
FIGS. 7A and 7B illustrate examples of encoder and decoder DPB states mismatch due to the network packet loss, in accordance with some embodiments.
Figure 7B:
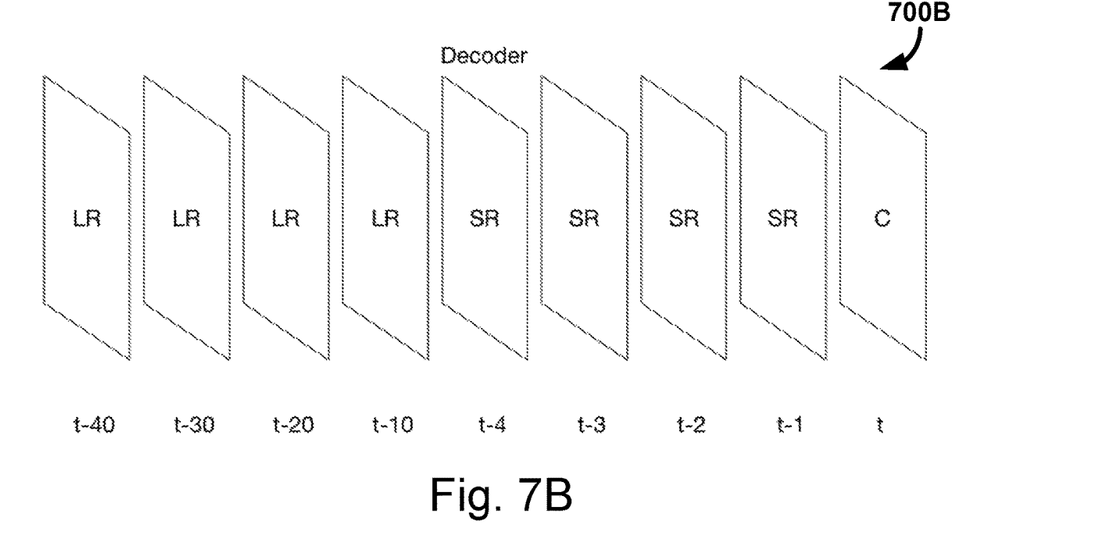

For example, in FIG. 7A-7B, suppose we mark a long term reference frame every 10 frames, if the encoder changes the number of long term reference frame from 4 to 2, the number of short term reference frame is then changed from 4 to 6. FIG. 7A is one possible result of changing the number of long term reference frames, seen generally at 700A. However, when the encoder does not receive the feedback that the decoder receives the command of change the number of long term reference frame, the encoder may not use the oldest 2 short term reference frames (frame t-5 and frame t-6 in FIG. 7A) as reference for the current frame. If the decoder does not receive the command of changing the number of long term reference, there will be 4 long term reference frames and 4 short term reference frames in its DPB, as seen at 700B of FIG. 7B, the oldest 2 short term reference frames in the encoder will be automatically removed in the decoder. If encoder happens to use the oldest 2 short term reference frames as reference to encode the current frame, it may not be decodable in the decoder.

In some embodiments, if the encoder marks the current frame as a long term reference frame or a short term reference frame by an explicit command, the encoder may, but is not limited to, assume the decoder's DPB is full with all kinds of combinations of long term reference frame(s) and short term reference frame(s). In this case, the encoder may first transmit a command to remove a reference frame in decoder's DPB. Based on the decoder's feedback, the encoder may make sure that removing a reference frame command may successfully remove a reference frame in the decoder's DPB.

For example, returning to FIG. 4, if the encoder ensures that the short term reference frame t-3 both exists in encoder's DPB and decoder's DPB, then it may first transmit the command to mark frame t-3 as 'unused for reference' and then transmit the command to make the current frame as a long term reference frame or a short term reference frame. Otherwise, if the encoder does not have the idea which reference frame exists in the decoder's DPB, it may transmit the commands to remove the latest L+1 reference frame as unused for reference. By this approach, the encoder ensures that at least one short term reference frame will be removed at the decoder side.

Figure 8A:
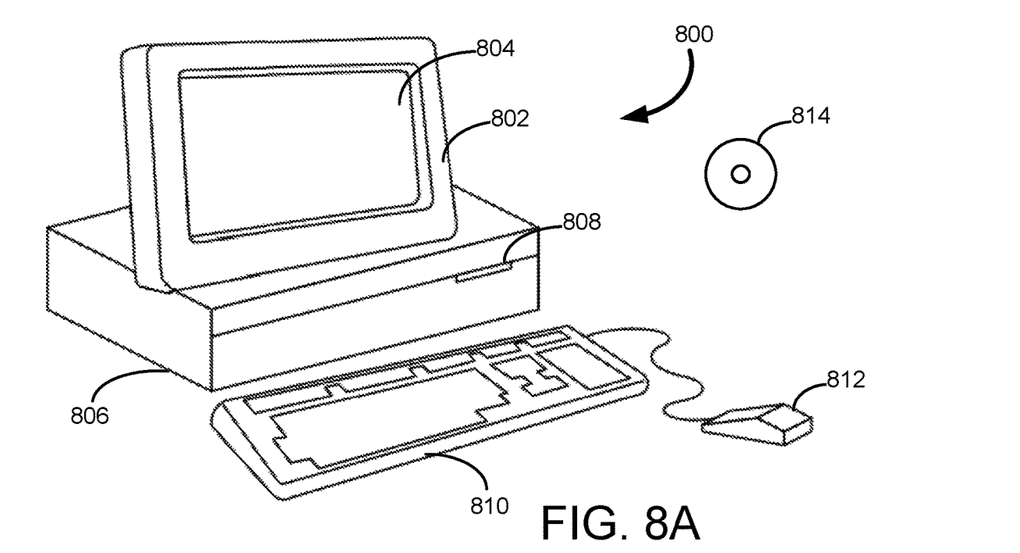
FIGS. 8A and 8B illustrate example computing systems capable of implementing the system for managing reference frame adaptively, in accordance with some embodiments.
Figure 8B:
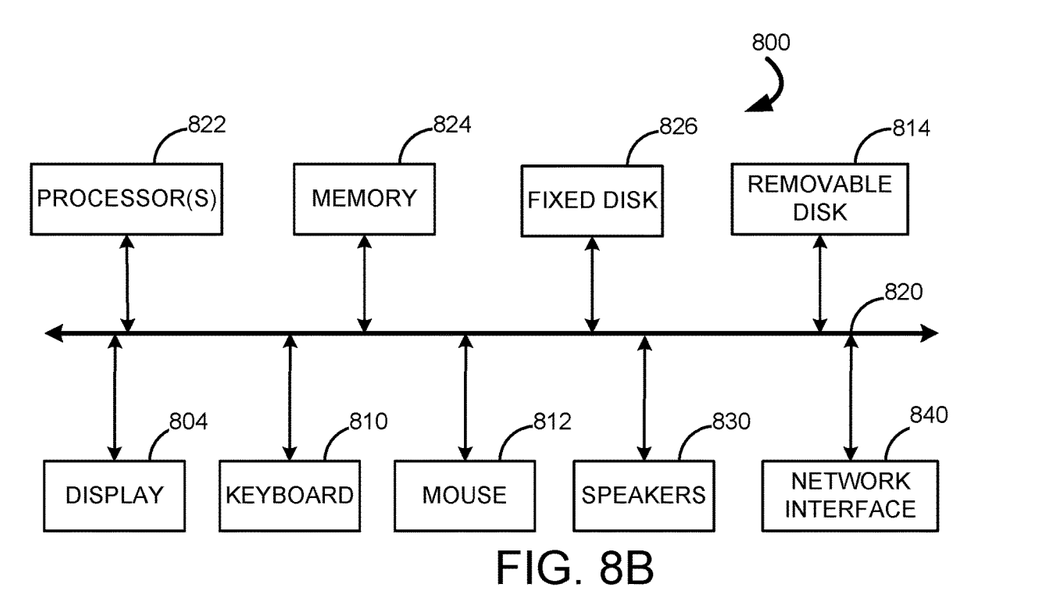

Now that the systems and methods for the adaptive management of reference frames has been described in detail, attention shall now be focused upon systems capable of executing the above functions. To facilitate this discussion, FIGS. 8A and 8B illustrate a Computer System 800, which is suitable for implementing embodiments of the present invention. FIG. 8A shows one possible physical form of the Computer System 800. Of course, the Computer System 800 may have many physical forms ranging from a printed circuit board, an integrated circuit, and a small handheld device up to a huge super computer. Computer system 800 may include a Monitor 802, a Display 804, a Housing 806, a Disk Drive 808, a Keyboard 810, and a Mouse 812. Disk 814 is a computer-readable medium used to transfer data to and from Computer System 800.

FIG. 8B is an example of a block diagram for Computer System 800. Attached to System Bus 820 are a wide variety of subsystems. Processor(s) 822 (also referred to as central processing units, or CPUs) are coupled to storage devices, including Memory 824. Memory 824 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 826 may also be coupled bi-directionally to the Processor 822; it provides additional data storage capacity and may also include any of the computer-readable media described below. Fixed Disk 826 may be used to store programs, data, and the like and is typically a secondary storage medium (such as a hard disk) that is slower than primary storage. It will be appreciated that the information retained within Fixed Disk 826 may, in appropriate cases, be incorporated in standard fashion as virtual memory in Memory 824. Removable Disk 814 may take the form of any of the computer-readable media described below.

Processor 822 is also coupled to a variety of input/output devices, such as Display 804, Keyboard 810, Mouse 812 and Speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 822 optionally may be coupled to another computer or telecommunications network using Network Interface 840. With such a Network Interface 840, it is contemplated that the Processor 822 might receive information from the network, or might output information to the network in the course of performing the above-described coding based upon weighted belief networks. Furthermore, method embodiments of the present invention may execute solely upon Processor 822 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone (or other smart phone), a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It may also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. In a communication system, a method comprising:
   determining a network condition, at a network estimator of a first client, based on at least one of network type of at least one other client, network bandwidth, network delay, and network congestion;
   establishing, in an encoder of the first client, a bitrate of an encoded bit stream, interval between I frames, and resolution of encoded video based upon the network condition for a connection stage;
   adaptively updating the interval between I frames, the bitrate of the encoded bit steams, and the resolution of the encoded video based upon feedback from at least one of the at least one other client;
   exiting a connection stage and entering a communication stage for the first client when feedback from the at least one other client signals successful decoding of at least one I frame; and
   altering a ratio between a number of long term reference frames and short term reference frames in a decoded picture buffer (DPB) inversely to the network delay when in the communication stage.

2. The method of claim 1, further comprising reentering the connection stage when the network has a bandwidth that results in the feedback not being received in under two seconds.

3. The method of claim 2, wherein re-entering the connection stage includes repeating the determination of the network condition, establishing the bitrate, interval between I frames, and resolution, and adaptively updating the bitrate, interval between I frames, and resolution, and exiting the re-entered connection stage.

4. The method of claim 1, wherein the network condition is at least one of WIFI, 4G, 3G, LTE and 2G.

5. The method of claim 4, wherein the bitrate of the encoded bit steams is between 1000-10 kbps.

6. The method of claim 4, wherein the bitrate of the encoded bit steams is between 500-20 kbps.

7. The method of claim 4, wherein the bitrate is varied by 10 kbps based upon the network condition.

8. The method of claim 1, wherein the bitrate is 500 kbps for a 4G level network condition.

9. The method of claim 1, wherein the bitrate is between 300-100 kbps for a 3G level network condition.

10. The method of claim 1 wherein the bitrate is between 150-50 kbps for an LTE level network condition.

11. The method of claim 1, wherein the bitrate is between 50-20 kbps for a 2G level network condition.

12. The method of claim 4, wherein the interval between I frames is between 100 ms to 2 seconds.

13. The method of claim 4, wherein the interval between I frames is between 200 ms to 1 seconds.

14. The method of claim 4, wherein the interval between I frames is adjusted by 100 ms increments based upon the network condition.

15. The method of claim 1, wherein the interval between I frames is 200 ms for a 4G level network condition.

16. The method of claim 1, wherein the interval between I frames is between 400-700 ms for a 3G level network condition.

17. The method of claim 1, wherein the interval between I frames is between 600-900 ms for an LTE level network condition.

18. The method of claim 1, wherein the interval between I frames is between 900-1000 ms for a 2G level network condition.

19. The method of claim 4, wherein the resolution is between 720×480 to 160×120.

20. The method of claim 4, wherein the resolution is between 640×360 to 180×120.

21. The method of claim 1, wherein the resolution is 640×360 or 640×480 for a 4G level network condition.

22. The method of claim 1, wherein the resolution is 512×384 or 512×288 for a 3G level network condition.

23. The method of claim 1, wherein the resolution is 320×240 or 265×192 or 320×180 for an LTE level network condition.

24. The method of claim 1, wherein the resolution is 180×120 or 160×120 for a 2G level network condition.

25. The method of claim 2, further comprising:
setting at least one reference frame to a current frame;
setting each of the reference frames as at least one long term reference frame, at least one short term reference frame, and at least one unused for reference;
designating the current frame as one of a long term reference frame, a short term reference frame, unused for reference or skip encoding the current frame; and
altering a frequency ratio of the designation of the current frame as the short term reference frame.

\* \* \* \* \*